Patented Aug. 6, 1940

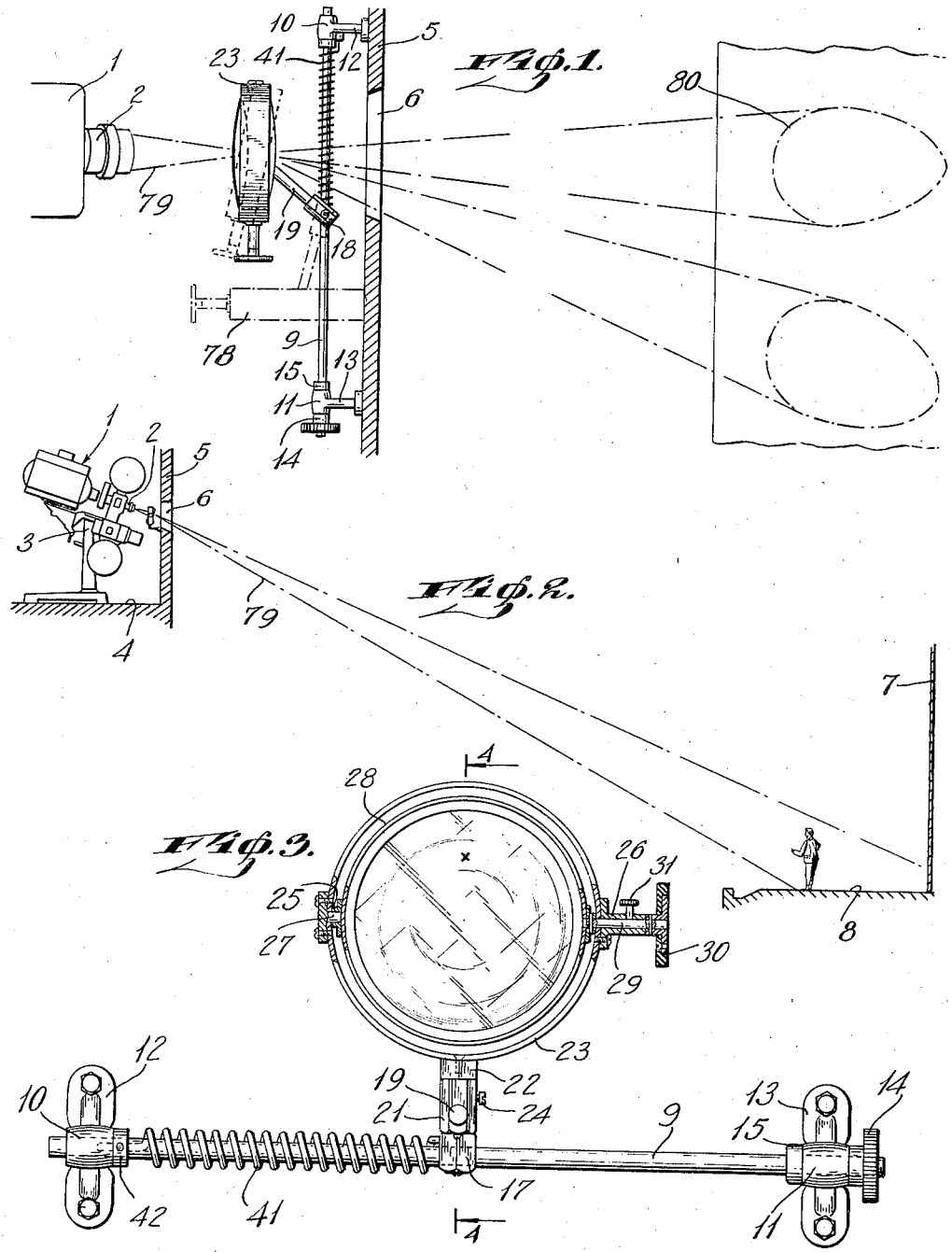

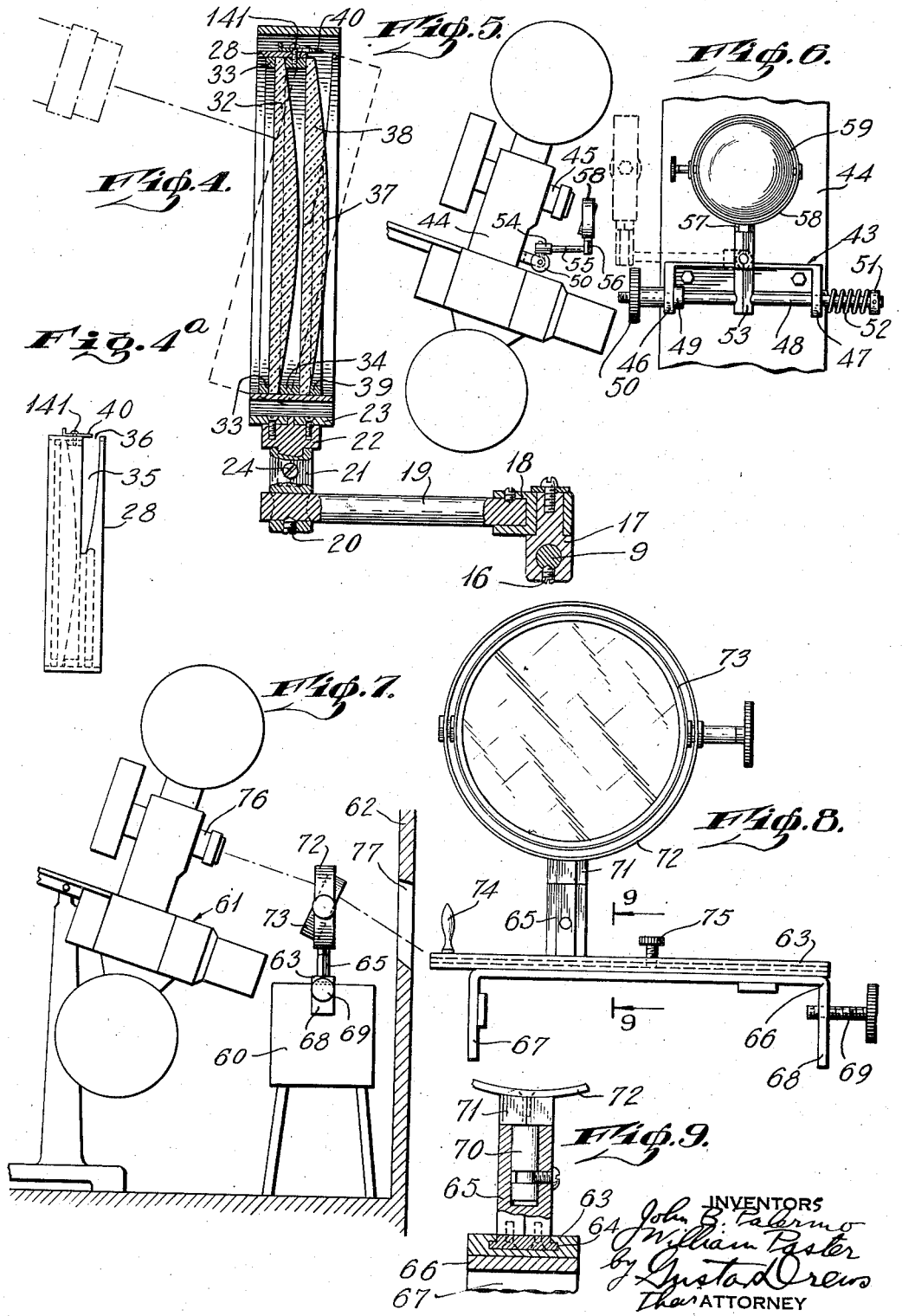

2,210,554

UNITED STATES PATENT OFFICE 2,210,554

SPOTLIGHT

John B. Palermo and William Paster, Brooklyn, N. Y., assignors of one-third to Charles L. Beckman, Brooklyn, N. Y.

Application January 17, 1939, Serial No. 251,320

10 Claims. (Cl. 240—3)

This invention relates to spotlights in general.

Among the objects of the present invention, it is aimed to provide an improved spotlight or rather an improved spotlight producing apparatus whereby with facility merely a condenser or condenser unit may be manipulated at the focal point of a light beam emanating from any suitable light source.

It is a further object of the present invention to provide an improved spotlight producing apparatus consisting of a main projection machine and a condenser or condenser unit disposed at the focal point of the light beam emanating from the light source of such projection machine and suitable control means for manipulating the condenser or condenser unit to illuminate the particular spot desired by the spotlight so produced.

It is still another object of the present invention to provide an improved spotlight forming device including a condenser whereby the rotation of the condenser at the focal point of a light beam will control the positioning of the spotlight and also control the movement of the spotlight relative to a moving object.

It is still another object of the present invention to provide an improved spotlight forming device whereby the light beam of an ordinary projection machine may with facility be diverted from the screen down onto the stage or other portion of the auditorium by positioning an area of a condenser above its axis and at the focal point of the light beam and then manipulating such condenser about an axis or series of axes without disturbing the position of the projection machine or its objective lens unit.

It is still another object of the present invention to provide an improved spotlight forming device whereby the light beam of an ordinary projection machine may with facility be diverted from the screen down onto the stage or other portion of the auditorium and caused to follow a moving object without disturbing the position of the projection machine or its objective lens unit and which spotlight forming device may with facility be converted into a floodlight forming device and in turn be caused to intercept the light beam at its focal point or be caused to clear such light beam.

These and other features, capabilities and advantages of the invention will appear from the subjoined detail description of specific embodiments thereof illustrated in the accompanying drawings in which—

Figure 1 is a fragmental plan view partly in section of one embodiment of the invention;

Fig. 2 is a reduced side elevation of the embodiment illustrated in Fig. 1 showing the path of the light beam and resulting spotlight more or less diagrammatically;

Fig. 3 is an enlarged end elevation of the condenser unit and supporting means for the same of the embodiment illustrated in Figs. 1 and 2;

Fig. 4 is an enlarged section on the line 4—4 of Fig. 3;

Fig. 4a is a side elevation of the inner ring on a slightly reduced scale as compared to the showing in Fig. 4 with one of the lenses removed;

Fig. 5 is a side elevation of another embodiment of the invention showing a projection machine with the spotlight attachment connected thereto;

Fig. 6 is a fragmental enlarged front elevation of the embodiment illustrated in Fig. 5;

Fig. 7 is a side elevation of a third embodiment of the invention showing a projection machine and condenser unit mounted on a sound apparatus separate from the projection machine;

Fig. 8 is an enlarged rear elevation of the spotlight attachment; and

Fig. 9 is a section on the line 9—9 of Fig. 8.

In the embodiment shown in Figs. 1, 2, 3 and 4, the projection machine 1 provided with the ordinary objective lens unit 2 is connected to the frame 3 mounted on the platform or floor 4 extending in the present embodiment rearwardly from the partition 5 of the projection booth. The partition 5 is provided with the usual opening 6 to permit the light rays from the objective lens unit 2 to pass therethrough onto the screen 7 disposed as an instance to the rear of the stage 8.

In the present embodiment, beneath the lower level of the opening 6 is mounted the shaft 9 journaled in the bearings 10 and 11 formed in the brackets 12 and 13 respectively secured to and extending rearwardly from the partition 5. One end of the shaft 9 is threaded to receive the clamp screw 14 for locking the shaft 9 in position, the set screw 14 in the present instance drawing the shaft 9 with its collar 15 into locking engagement with the journal 11. On the shaft 9 and preferably in the present instance at the middle thereof, there is fixedly connected by the set screw 16 the arm 17 to one end of which is journaled the connection 18 connected to the arm 19 on the outer end of which is fixed by the set screw 20 the arm 21 in which is journaled the bearing 22 connected to one end of the main ring 23.

In some instances, it may of course be desirable to prevent the bearing 22 from freely rotating in the arm 21 when the set screw 24 may be turned to anchor the bearing 22 against rotation in the arm 21.

The ring 23 at diametrically opposed ends, preferably as shown a quadrant removed from the bearing 22, there are provided the bearings 25 and 26, the bearing 25 in the present instance receiving the pin 27 of the inner ring 28 and the bearing 26 receiving the pin 29 of the inner ring 28. The pins 27 and 29 are so mounted on the ring 28 that the ring 28 can rotate inside of the ring 23. The pin 29 as shown in Fig. 3 has preferably secured to the outer end thereof, the control wheel 30. The control wheel 30 and pin 29 may be anchored against rotation in the bearing 26 by the set screw 31. The inner frame 28 in the present instance, see particularly Figs. 4 and 4a is provided to receive a single condenser 32 sufficient to produce an ordinary spotlight. This condenser is anchored in the ring 28 by the positioning rings 33 and 34. The inner ring 28 is preferably provided with the tapering opening 35 shown in Fig. 4a, the outer end 36 of which is wide enough to permit the passage of the central portion 37 of the second condenser 38. This condenser 38 may be inserted through the opening 35 and then positioned by the ring portion 39 in the inner ring member 28 and thereafter while the ring 28 is tilted in the dotted line position shown in Fig. 4, the slide 40 slidably mounted on the screw 141 connected to the outer end of the ring member 28 may be moved over across the outer end of the opening 35 to lock the condenser 38 against accidental displacement.

This second lens 38 is added to produce a special type of spotlight, such as a floodlight. When the spotlight ring 23 and associated parts are not in use, they may be swung around the bearing 17 into the dash and dot line position shown in Fig. 1. To counterbalance the weight of the rings 23, 28 and associated parts relative to the shaft 9, there is preferably provided a device such as the spring 41 connected at one end to the arm 17 and at the other end to the bearing 10. Preferably as shown, there is fixed a small collar 42 on the shaft 9 adjacent to the bearing 10 to position the shaft 9 relative to the bearings 10 and 11.

In the embodiment shown in Figs. 5 and 6, a bracket 43 is secured to the front face of the projection apparatus 44 immediately below the objective lens unit 45. This bracket 43 has ears 46 and 47 for receiving the shaft 48, similar to shaft 9 of the embodiment illustrated in Fig. 1. One end of the shaft 48 has a collar 49 fixed thereon to engage one face of the ear 46 to position the shaft 48 and also to form an abutment for anchoring the shaft 48 against angular movement when the clamp screw 50 screw threadedly connected to one end of the shaft 48 adjacent the ear 46 is turned tightly against the ear 46. The other end of the shaft 48 has a collar 51 fixed thereon to which is connected one end of the coil spring 52, the other end of which is connected to the ear 47.

The coil spring 52 is provided to serve as a counter-balancing medium to facilitate in positioning the shaft 48 with the condenser support now to be described in erect position.

On the shaft 48, there is fixed an arm 53 having a bearing at the upper end pivotally to receive the sleeve 54, in which sleeve 54 is mounted the arm 55 to the outer end of which is secured the bracket 56 in the upper end of which is pivotally mounted the enlargement 57 secured to the outer ring 58. The ring 58 in the present instance is similar to the ring 23 of the embodiment illustrated in Fig. 1 and has associated therewith an inner ring 59 similar to the inner ring 28 and its associated condensers.

In the embodiment shown in Figs. 7, 8 and 9, the spotlight attachment is mounted on the sound unit 60 disposed between the projection machine 61 and the partition 62 of the projection booth. In this instance, instead of a shaft, such as the shaft 9 of Fig. 1 or the shaft 48 of Fig. 6, a flat stock piece 63 is provided having a dove-tail slot therein to receive the foot 64 of the upright 65. The flat stock piece 63 in the present instance is fixed to the U-shaped bracket 66. The downwardly extending portions 67 and 68 are intended to engage the ends of the sound unit 60 as shown in Fig. 7. In order to anchor the bracket 66 in position, the clamping screw 69 is provided screw threadedly connected with the extension 68 to protrude therethrough and engage one end of the sound unit 60. The upright 65 has a central opening therein to receive the pivot pin 70 of the enlargement 71 formed on the outer ring 72 similar to the outer ring 23 of the embodiment shown in Fig. 1 and equipped to receive an inner ring 73 similar to the inner ring 28 of the embodiment shown in Fig. 1. The foot 64 preferably extends to either side of the upright 65 and has a handle 74 formed on one end extending upwardly and a set screw 75 formed on the other end, the handle being used to position the foot 64 and thereby also to position the upright 65 and rings 72 and 73 with their condensers relative to the objective lens unit 76 either to clear the opening 77 in the partition 62 or to intercept the light rays to form a spotlight or floodlight as described with regard to the embodiment illustrated in Fig. 1.

With the apparatus just described, it will be noted that advantage is here taken of the fact that a light beam will be diverted at an angle when passing through an area of a condenser removed from its axis. As an instance, see Figs. 1, 2, 3 and 4, the light beam emanating at the objective lens unit 2 when not intercepted by the condenser 32 either alone or associated with the condenser 37 will be directed onto the screen 7 through the opening 6 when the ring 23 and its associated parts are swung down into the dash and dot line position 78 shown in Fig. 1.

It will also be seen that when the ring 23 and its associated parts are swung up into the full line position shown in Fig. 1, and see particularly Figs. 2 and 4, an area of the condenser 32 above its axis will intercept the light beam 79 at its focal point and divert it downward, depending upon the angle assumed by the condenser 32 relative to the vertical and that the spotlight 80 then formed may be moved from side to side by rotating the ring 23 and thereby the condenser 32 about its vertical axis formed by the enlargement 22 in the stem 21.

From the foregoing, it will also be seen that the projection machine 1 and its objective lens unit 2 may remain undisturbed as to position with the exception that the film will have to be removed from the light aperture so that when it is desired to resume the projection of a picture on the screen 7, it will only be necessary to reposition the film at the light aperture and to swing the ring 23 and its associated parts out of the path of the light beam into the position 78 as an instance.

It is obvious that various changes and modifications may be made to the details of construction without departing from the general spirit of the invention as set forth in the appended claims.

We claim:

1. The combination with the optical system of a projection machine including its projection lens, of a condensing lens, means for supporting the condensing lens with a portion of its area removed from its axis at the focal point of the light beam emanating in said optical system, and means for rotatably mounting said support enabling the spotlight so formed to follow a moving object.

2. The combination with the optical system of a projection machine including its objective lens unit, of a spotlight forming device including a condenser, and a universally rotatable support for the condenser positioning an off center area of the condenser at the focal point of the light beam produced by said optical system but movable to enable the spotlight formed by the condenser to follow a moving object.

3. The combination of a light source, an objective lens unit fixedly associated with said light source for receiving and forming a converging light beam, a spotlight forming device including a condensing lens intercepting the light beam at its focal point, and a pivoted supporting means for the condensing lens to enable the spotlight so formed to follow a moving object.

4. The combination of a light source, an objective lens unit for receiving light from said light source and forming a converging light beam, a frame having a fixed condenser and a removable condenser positioned to intercept the light beam at its focal point, the fixed condenser alone forming a spotlight and when associated with the removable condenser forming a floodlight, a horizontally extending arm rotatable about a vertical axis, and a second frame mounted to rotate about a vertical axis on said arm, said first frame mounted to rotate about a horizontal axis on said second frame, said arm being rotatable to move said first frame either to intercept or clear said beam of light, said frames being rotatable relative to said arm when the light beam is intercepted to control the position of the spotlight or floodlight being produced.

5. The combination of a projection machine including means for forming a converging light beam, a projection booth partition fixedly positioned with respect to said projection machine and having an opening therein registering with the light beam formed by said projection machine, a shaft, means for mounting said shaft below the opening in said partition, an arm pivotally connected at one end to said shaft, a spotlight forming device mounted at the other end of said arm, a coil spring associating said arm with said shaft to facilitate supporting the spotlight forming device, said spotlight forming device including a condenser, and means for movably associating said condenser with said arm to enable said condenser to be positioned at the focal point of said light beam just inside of said partition between said partition and said projection machine and to enable the spotlight so formed to follow a moving object.

6. The combination of a projection machine including means for forming a converging light beam, a projection booth partition fixedly positioned with respect to said projection machine and having an opening therein through which said light beam is enabled to pass, a support between said projection machine and said partition, a frame clamped on said support, a bar slidably mounted on said frame, an upright formed on said bar, a ring rotatably mounted on said upright, a second ring mounted to rotate about a horizontal axis in said first ring, and a condenser mounted in said second ring, said bar being slidable to move said condenser either to clear said light beam or intercept the same at its focal point just inside of said partition between said partition and said projection machine, said rings being rotatable to enable the spotlight formed when the light beam is intercepted to follow a moving object.

7. The combination of a projection machine having a light source and means cooperating with said light source to form a converging light beam, a bracket secured to said projection machine, a shaft mounted in said bracket, a set screw and a coil spring cooperating to anchor said shaft in position, a bearing on said shaft, an arm rotatably mounted on said bearing to rotate about a vertical axis, a bearing at the other end of said arm, a ring mounted on said latter bearing to rotate about a vertical axis, a second ring mounted to rotate about a horizontal axis in said first ring, and a condenser mounted in said second ring, said arm being movable to swing said condenser either to intercept said light beam at the focal point just inside of said partition between said partition and said projection machine or clear the same, the rotatable movement of said rings enabling the spotlight formed by the condenser when intercepting the light beam to follow a moving object.

8. The combination of a projection machine including means for forming a converging light beam, a projection booth partition fixedly positioned with respect to said projection machine and having an opening therein to enable the light beam to pass therethrough, a shaft mounted below the opening in said partition, an arm pivotally mounted at one end on said shaft, a spotlight forming device movably mounted at the other end of said arm, and a coil spring associating said arm with said shaft to facilitate supporting said spotlight forming device above said shaft, said arm being rotatable to move said spotlight forming device either to intercept the light beam at its focal point or to clear the same.

9. A spotlight forming device including a shaft, an arm rotatably mounted on said shaft about a vertical axis, a ring rotatably mounted at the free end of said arm about a vertical axis, a second ring rotatably mounted in said first ring about a horizontal axis, a condenser mounted in said second ring to intercept a light beam and form a spotlight, and a control handle extending through said first ring into association with said second ring to control the angular relation of said condenser relative to the light beam being intercepted and also to facilitate swinging said arm with its frames relative to said shaft.

10. A spotlight forming device including a movable support, a ring mounted to rotate about a vertical axis on said support, a second ring mounted in said first ring to rotate about a horizontal axis, a condenser, securing rings fixing said condenser in said second ring, a tapering slot in said second ring, a second condenser movable into position in said second ring through said slot when said second ring is tilted about its horizontal axis to clear said first ring, and a slidable plate mounted on said second ring to extend across said slot and thereby anchor said second condenser against accidental displacement.

JOHN B. PALERMO.
WILLIAM PASTER.